(12) United States Patent
Kapoor et al.

(10) Patent No.: US 8,153,934 B2
(45) Date of Patent: Apr. 10, 2012

(54) SAW FLUX SYSTEM FOR IMPROVED AS-CAST WELD METAL TOUGHNESS

(75) Inventors: Ashish Kapoor, Highland Heights, OH (US); Teresa Melfi, Kirtland, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 482 days.

(21) Appl. No.: 11/522,879

(22) Filed: Sep. 15, 2006

(65) Prior Publication Data

US 2008/0078809 A1  Apr. 3, 2008

(51) Int. Cl.
*B23K 9/00* (2006.01)

(52) U.S. Cl. ....... 219/137 WM; 219/145.55; 219/146.1; 219/146.52

(58) Field of Classification Search ........... 219/137 WM
See application file for complete search history.

(56) References Cited

U.S. PATENT DOCUMENTS

| | | | |
|---|---|---|---|
| 3,424,626 A | | 1/1969 | Coless et al. |
| 3,531,620 A | | 9/1970 | Arikawa et al. |
| 3,551,217 A | | 12/1970 | Coless |
| 3,670,135 A | | 6/1972 | Zvanut |
| 3,767,891 A | | 10/1973 | Haverstraw |
| 4,221,611 A | * | 9/1980 | Nagano et al. ............ 148/26 |
| 4,430,545 A | * | 2/1984 | Mori et al. ............... 219/73 |
| 4,465,921 A | * | 8/1984 | Sakai et al. ............ 219/146.24 |
| 4,551,610 A | * | 11/1985 | Amata .................. 219/146.3 |
| 4,917,958 A | | 4/1990 | Akai |
| 4,940,882 A | | 7/1990 | Bates |
| 4,950,331 A | * | 8/1990 | Pokhodnya et al. .......... 106/313 |
| 5,171,376 A | * | 12/1992 | Hignett et al. .............. 148/23 |
| 5,192,851 A | * | 3/1993 | James et al. ............ 219/130.51 |
| 5,308,407 A | | 5/1994 | Bishel |
| 5,365,036 A | * | 11/1994 | Crockett et al. ........ 219/137 WM |
| 6,608,284 B1 | * | 8/2003 | Nikodym .............. 219/137 WM |
| 6,939,413 B2 | | 9/2005 | Crockett |
| 6,940,042 B2 | * | 9/2005 | Hara et al. ............... 219/145.22 |
| 7,087,859 B2 | | 8/2006 | Burt |
| 2001/0023863 A1 | * | 9/2001 | Bonnet et al. ......... 219/137 WM |
| 2004/0187961 A1 | | 9/2004 | Crockett |
| 2005/0121110 A1 | | 6/2005 | Dallam |
| 2005/0127132 A1 | | 6/2005 | Crockett |
| 2005/0247688 A1 | | 11/2005 | Burt |
| 2005/0257853 A1 | | 11/2005 | Yamashita |

(Continued)

FOREIGN PATENT DOCUMENTS

EP  0060608  8/1985

(Continued)

OTHER PUBLICATIONS

Davies, A. C., "The science and practice of welding", Cambridge University Press, Cambridge, 1989, vol. 1 "Welding science and technology", ISBN 0521369541, p. 63.

(Continued)

*Primary Examiner* — Henry Yuen
*Assistant Examiner* — Brian Jennison
(74) *Attorney, Agent, or Firm* — Hahn Loeser & Parks, LLP; Keith J. Marcinowski

(57) ABSTRACT

A granular flux having controlled amounts of titanium and boron to facilitate in the formation of a weld metal having a high toughness without requiring refinement of the weld metal by reheating the weld metal, and enabling the slag to be easily removed from the weld bead.

22 Claims, 4 Drawing Sheets

U.S. PATENT DOCUMENTS

| | | |
|---|---|---|
| 2006/0081579 A1 | 4/2006 | Kotecki |
| 2006/0096966 A1 | 5/2006 | Munz |
| 2006/0144836 A1 | 7/2006 | Karogal |
| 2006/0165552 A1 | 7/2006 | Kapoor |
| 2006/0196919 A1* | 9/2006 | James et al. .................. 228/223 |

FOREIGN PATENT DOCUMENTS

| | | |
|---|---|---|
| EP | 0176411 | 8/1988 |
| GB | 0991562 | 5/1965 |
| GB | 1135131 | 11/1968 |
| JP | 2000107885 | 4/2000 |
| JP | 2002018595 | 1/2002 |
| WO | WO 8907036 | 8/1989 |
| WO | WO 02098599 | 12/2002 |

OTHER PUBLICATIONS

Miller and Company, "Ferro-titanium specifications", Online data sheet, Retrieved Sep. 1, 2010, URL <http://www.millerandco.com/products/alloys_iron/specifications/printable/ferro-titanium.htm>.

Reade, "Ferro Boron (FeB) Powder from READE", Online data sheet, Retrieved Sep. 1, 2010, URL <http://www.reade.com/products/18-ferro-alloys-powder/182-ferro-boron-powder-feb-ferroboron-ferro-boron-granules-ferroboron-lump-cas11108671>.

* cited by examiner

SAW FLUX SYSTEM FOR IMPROVED AS-CAST WELD METAL TOUGHNESS

The present invention relates to a granular flux for electric arc welding, and more particularly to a novel basic Ti/Bor flux with a small amount of titanium and boron.

BACKGROUND OF INVENTION

In submerged arc welding, an advancing welding wire moves through a granular flux so an electric arc between the wire and workpiece melts the advancing wire and deposits a weld metal onto the workpiece. The flux is at least partially melted during the welding process and forms a slag over the top of the molten metal deposited on the workpiece. The slag is designed to protect the molten metal from the ingress of atmospheric impurities. When forming a tough weld metal, it has been common practice to use small amounts of titanium and boron as an additive to the flux. In such fluxes, the slag system itself is not based upon titanium dioxide (e.g., rutile). The flux disclosed in the present invention has a high Basicity Index (BI) so that fine grain structure is obtained by use of small amounts of titanium and boron. Toughness of a weld metal is commonly determined by a Charpy test. High toughness weld metal normally requires use of a high BI (i.e., BI exceeding about 2). It has been found that a highly basic flux that includes small amounts of titanium and boron produces a fine grain size and a high toughness weld metal, thus resulting in a significant improvement of prior art welding fluxes. These patents are incorporated by reference herein as background information on fluxes to which the present invention is directed. Although it is known in the art to use small amounts of titanium and boron in a granular flux to create a Ti Bor weld metal, this weld metal often must be reheated after solidification to refine the grain size of the weld metal.

Many prior highly basic fluxes do not use a titanium dioxide slag system. As such, when titanium and boron were added to such flux systems, a relatively large amount of titanium dioxide or titanium powder was added to such flux systems. The large addition of a titanium source to the flux system resulted in at least about 20 ppm of titanium to be deposited in the weld metal. This higher level of titanium in the weld metal resulted in poor slag removal from the weld metal. A flux system that included a rutile based slag system drastically increased the amount of titanium in the weld metal, resulting in even more difficult slag removal from the weld bead. Even though the large amounts of titanium in the weld metal made it more difficult to remove slag from the weld bead, high levels of titanium were believed to be required to from the necessary toughness of the weld metal. In prior flux systems that included boron, the boron content was maintained at quite low levels since only a very small amount of boron is generally desired for fine grain size of the weld metal. The ratio of titanium to boron in the weld metal formed by these prior flux systems was normally at least about 10:1.

The resulting weld metal formed by prior flux systems that included titanium and boron typically required the weld metal to be reheated so as to improve the toughness of the weld metal. When applying multiple layers of weld metal, the lower layer of weld bead can be reheated by the application of a molten weld metal on top of the lower layer of weld metal. However, the top layer of the weld metal is not exposed to another molten layer of weld metal, thus is not reheated during a welding process. As such, this top layer of weld metal can have a reduced hardness. Some prior art fluxes reduced the amount of titanium and boron in the flux system so as to avoid the need to reheat the weld metal; however, the level of titanium in such flux system remained high enough to cause slag removal problems from the weld metal.

In view of the current state of the art of welding fluxes, there is a need for a welding flux that can form high hardness weld metal without the need to reheat the weld metal and which the slag formed during the welding process can be easily removed from the weld metal.

SUMMARY OF THE INVENTION

The present invention is directed to a flux system that includes titanium and boron and which addresses the problems of part flux systems with regard to hardness and slag removal. The present invention in is directed to a granular flux system that includes a small amount of a titanium source and a small amount of a boron source to form a Ti/Bor system in the weld metal. The flux system of the present invention will be described with particular reference to a granular flux that does not include a titanium dioxide slag system. The inclusion of titanium and boron in the weld metal is known to improve the toughness of the weld metal, however, the exact mechanism by which this is achieved is not fully understood. It is believed that small amounts of boron in the weld metal inhibited or prevented grain growth by the boron migrating to the grain boundaries during solidification of the weld metal so that fine acicular ferrite is formed in the weld metal. The formation of acicular ferrite in the weld metal promoted the fine grain size in the weld metal, thus resulting in an increase in toughness of the weld metal. It is also believed that the titanium 1) combined with oxygen and/or nitrogen in the weld metal to remove inclusions which can reduce the effectiveness of the boron in the weld metal, and 2) formed $TiO_2$ and TiN in the weld metal that acted as nucleation sites for the formation of ferrite acicular ferrite is formed in the weld metal. In prior flux systems, high levels of titanium were in included in the flux system so as to produce high level of titanium (e.g., exceeding about 20 ppm) in the weld metal. This large titanium addition to the flux system was believed to be necessary to coact with the small amount of boron. Boron is highly reactive with any oxygen and nitrogen that is dissolved in the weld metal. In order to inhibit or prevent the boron in the weld metal from reacting with oxygen and nitrogen, the weld metal was commonly killed by the use of aluminum. The flux system of the present invention is formulated so that the use of aluminum to remove oxygen and nitrogen in the weld metal is not required. The flux system of the present invention is formulated so that the boron and titanium in the weld metal simultaneously kill the steel by removing oxygen and/or nitrogen with titanium and retard the ferrite transformation by the use of boron thereby preventing the formation of banite.

In accordance with one non-limiting aspect of the present invention, there is provided a granular flux that includes a titanium source and a boron source. The flux system of the present invention can be used in a variety of welding processes (e.g., SAW, SMAW, GMAW, FCAW, etc.). The flux system of the present invention can be used to facilitate in the formation of a high toughness weld metal without the need to reheat the solidified weld metal. The flux system of the present invention also is formulated to provide for easy slag removal from the weld metal once the weld metal has solidified. Consequently, the flux system of the present invention can be used to 1) obtain a high toughness weld bead formed by the cap pass in a pipe welding operation with a system, on an offshore joint that requires a cap pass, etc., and 2) form a slag on the weld metal that can be easily removed. In one non-limiting embodiment of the present invention, the flux system is a basic flux system that includes a small amount of added titanium and boron. The titanium and boron source in the flux system as included in the flux system so as to transfer titanium metal and boron metal to the weld metal, as opposed to the formation of a slag during the weld process. In one non-limiting aspect of this embodiment, at least about 20 weight percent of the titanium metal in the flux system is transferred to the weld metal. In an additional and/or alternative non-limiting aspect of this embodiment, at least about 40 weight percent of the titanium metal in the flux system is transferred to the weld metal. In still an additional and/or alternative non-limiting aspect of this embodiment, at least a majority weight percent of the titanium metal in the flux system is transferred to the weld metal. In yet an additional and/or alternative non-limiting aspect of this embodiment, at least about 60 weight percent of the titanium metal in the flux system is transferred to the weld metal. In still yet an additional and/or alternative non-limiting aspect of this embodiment, at least about 80 weight percent of the titanium metal in the flux system is transferred to the weld metal. In an additional and/or alternative non-limiting aspect of this embodiment, at least about 90 weight percent of the titanium metal in the flux system is transferred to the weld metal. In still an additional and/or alternative non-limiting aspect of this embodiment, at least about 20 weight percent of the boron metal in the flux system is transferred to the weld metal. In yet an additional and/or alternative non-limiting aspect of this embodiment, at least about 40 weight percent of the boron metal in the flux system is transferred to the weld metal. In still yet an additional and/or alternative non-limiting aspect of this embodiment, at least a majority weight percent of the boron metal in the flux system is transferred to the weld metal. In an additional and/or alternative non-limiting aspect of this embodiment, at least about 60 weight percent of the boron metal in the flux system is transferred to the weld metal. In still an additional and/or alternative non-limiting aspect of this embodiment, at least about 80 weight percent of the boron metal in the flux system is transferred to the weld metal. In yet an additional and/or alternative non-limiting aspect of this embodiment, at least about 90 weight percent of the boron metal in the flux system is transferred to the weld metal.

In accordance with an additional and/or alternative non-limiting aspect of the present invention, there is provided a granular flux that is a highly basic flux system that includes a titanium source and a boron source. The highly basic flux system is formulated to obtain a weld metal having high impact properties by the Charpy V-notch procedure. In one non-limiting embodiment of the present invention, the flux system of the present invention has a Basicity Index (BI) of at least about 1.4 as measured by the standard Boniszewski formula. In one non-limiting aspect of this embodiment, the flux system of the present invention has a BI of at least about 1.5. In an additional and/or alternative non-limiting aspect of this embodiment, the flux system of the present invention has a BI of about 1.5-3.5. In still an additional and/or alternative non-limiting aspect of this embodiment, the flux system of the present invention has a BI of about 1.8-3. In yet an additional and/or alternative non-limiting aspect of this embodiment, the flux system of the present invention has a BI of about 2-2.8. In still yet an additional and/or alternative non-limiting aspect of this embodiment, the flux system of the present invention has a BI of about 2.4-2.8.

In accordance with still an additional and/or alternative non-limiting aspect of the present invention, there is provided a granular flux that includes a majority weight percent of at least two slag forming compounds selected from the group of aluminum oxide, calcium fluoride, calcium oxide, and magnesium oxide. In one non-limiting embodiment of the invention, the weight percent of any one of aluminum oxide, calcium fluoride, calcium oxide, and magnesium oxide in the flux system does not exceed about 60 weight percent of the flux system. In one non-limiting aspect of this embodiment, the weight percent of any one of aluminum oxide, calcium fluoride, calcium oxide, and magnesium oxide in the flux system does not exceed about 50 weight percent of the flux system. In an additional and/or alternative non-limiting aspect of this embodiment, the weight percent of any one of aluminum oxide, calcium fluoride, calcium oxide, and magnesium oxide in the flux system does not exceed about 40 weight percent of the flux system. In an additional and/or alternative embodiment of the invention, the flux system of the present invention includes calcium fluoride and magnesium oxide. In still an additional and/or alternative embodiment of the invention, the flux system of the present invention includes calcium fluoride calcium oxide, and magnesium oxide. In yet an additional and/or alternative embodiment of the invention, the flux system of the present invention includes aluminum oxide, calcium fluoride calcium oxide, and magnesium oxide. In still yet an additional and/or alternative embodiment of the invention, the flux system of the present invention can include one or more compounds selected from silicon dioxide and manganese oxide.

In accordance with yet an additional and/or alternative non-limiting aspect of the present invention, the titanium source and the boron source in the flux system of the present invention can be in the form of pure metal, metal alloy and/or a metal compound. In one non-limiting embodiment of the invention, the titanium source in the flux system can include titanium metal, titanium dioxide, titanium nitride, titanium boride, and/or titanium oxide. In one non-limiting aspect of this embodiment, the titanium source in the flux system includes titanium metal, titanium dioxide, and/or titanium nitride. In an additional and/or alternative non-limiting aspect of this embodiment, the titanium source in the flux system includes titanium metal and/or titanium dioxide. In an additional and/or alternative non-limiting embodiment of the invention, the boron source in the flux system can include boron metal and/or boron oxide.

In accordance with still yet an additional and/or alternative non-limiting aspect of the present invention, there is provided a granular flux that includes a controlled amount of titanium and boron. In one non-limiting embodiment of the invention, the titanium source in the flux system includes less than about 0.5 weight percent titanium. For example, if the titanium source is only in the form of titanium metal, the weight percent titanium metal in the flux system is equal to the weight percent of titanium in the flux system. In another example, if the titanium source is only titanium dioxide, the weight percent titanium in the flux system would be the weight percent of titanium dioxide multiplied by the weight ratio of titanium in the titanium dioxide (i.e., 0.6). In one non-limiting aspect of this embodiment, the titanium source in the flux system includes less than about 0.3 weight percent titanium. In an additional and/or alternative non-limiting aspect of this embodiment, the titanium source in the flux system includes about 0.05-0.25 weight percent titanium. In still an additional and/or alternative non-limiting aspect of this embodiment, the titanium source in the flux system includes about 0.1-0.22 weight percent titanium. In yet an additional and/or alternative non-limiting aspect of this embodiment, the titanium source in the flux system includes about 0.14-0.22 weight percent titanium. In an additional and/or alternative non-limiting embodiment of the invention, the boron source in the flux system includes less than about 0.1 weight percent boron. For example, if the boron source is only in the form of boron metal, the weight percent boron metal in the flux system is equal to the weight percent of boron in the flux system. In another example, if the boron source is only boron oxide, the weight percent boron in the flux system would be the weight percent of boron oxide multiplied by the weight ratio of boron in the boron oxide (i.e., 0.31). In one non-limiting aspect of this embodiment, the boron source in the flux system includes less than about 0.05 weight percent boron. In an additional and/or alternative non-limiting aspect of this embodiment, the boron source in the flux system includes about 0.005-0.04 weight percent boron. In still an additional and/or alternative non-limiting aspect of this embodiment, the boron source in the flux system includes about 0.01-0.035 weight percent boron. In yet an additional and/or alternative non-limiting aspect of this embodiment, the boron source in the flux system includes about 0.012-0.03 weight percent boron. In still an additional and/or alternative non-limiting embodiment of the invention, the titanium source in the flux system is limited so as to deposit less that about 18 ppm titanium in the weld metal. In one non-limiting aspect of this embodiment, the titanium source in the flux system is limited so as to deposit less that about 16 ppm titanium in the weld metal. In an additional and/or alternative non-limiting aspect of this embodiment, the titanium source in the flux system is limited so as to deposit about 5-15 ppm titanium in the weld metal. In still an additional and/or alternative non-limiting aspect of this embodiment, the titanium source in the flux system is limited so as to deposit about 8-14 ppm titanium in the weld metal. In yet an additional and/or alternative non-limiting embodiment of the invention, the boron source in the flux system is limited so as to deposit less that about 15 ppm boron in the weld metal. In one non-limiting aspect of this embodiment, the boron source in the flux system is limited so as to deposit less that about 12 ppm boron in the weld metal. In an additional and/or alternative non-limiting aspect of this embodiment, the boron source in the flux system is limited so as to deposit about 1-10 ppm boron in the weld metal. In still an additional and/or alternative non-limiting aspect of this embodiment, the boron source in the flux system is limited so as to deposit about 3-9 ppm titanium in the weld metal. In still yet an additional and/or alternative non-limiting embodiment of the invention, the ratio of titanium to boron in the flux system is about 1.5-20:1. In one non-limiting aspect of this embodiment, the ratio of titanium to boron in the flux system is about 2-10. In an additional and/or alternative non-limiting aspect of this embodiment, the ratio of titanium to boron in the flux system is about 2.5-6. In still an additional and/or alternative non-limiting aspect of this embodiment, the ratio of titanium to boron in the flux system is about 3-5. In an additional and/or alternative non-limiting embodiment of the invention, the ratio of titanium to boron that passes into the weld metal from the flux system is about 1.1-10. In one non-limiting aspect of this embodiment, the ratio of titanium to boron that passes into the weld metal from the flux system is about 1.2-4. In an additional and/or alternative non-limiting aspect of this embodiment, the ratio of titanium to boron that passes into the weld metal from the flux system is about 1.3-3. In still an additional and/or alternative non-limiting aspect of this embodiment, the ratio of titanium to boron that passes into the weld metal from the flux system is about 1.5-2.5.

In accordance with an additional and/or alternative non-limiting aspect of the present invention, there is provided a granular flux that can be used in submerged arc welding, in a cored electrode or as the coating of a stick electrode. One or more alloying metals can be used in combination with the flux system; however, this is not required.

Three non-limiting examples of the flux system of the present invention are set forth in weight percent as follows:

| Compound | Example 1 | Example 2 | Example 3 |
|---|---|---|---|
| $SiO_2$ | 0-30% | 0-20% | 10-18% |
| MgO | 15-40% | 25-35% | 26-32% |
| $CaF_2$ | 10-35% | 20-30% | 22-28% |
| $Al_2O_3$ | 0-35% | 0-30% | 18-24% |
| CaO | 0-15% | 0-10% | 2-6% |
| $Mn_xO_y$ | 0-10% | 0-5% | 1-3% |
| $TiO_2$ | 0.05-0.6% | 0.2-0.4% | 0.25-0.33% |
| $B_2O_3$ | 0.01-0.15 | 0.06-0.10% | 0.07-0.09% |

In each of the examples set for above, the titanium source is titanium dioxide and the boron source is boron oxide. As can be appreciated, other or additional titanium and/or boron sources could have been used. The flux system in each of the examples is a fluoride basic flux as opposed to a titanium oxide-based flux. The BI for each of the flux systems set forth above was about 1.5-2.8. The average particle size of the flux system in the three examples was such that at least about 80-90% of the particles of the flux system could pass through a 12-100 mesh screen, and less than about 1-5% particles of the flux system could pass through a +100 mesh screen. The flux systems in each of the three examples resulted in less than 15 ppm titanium passing from the flux system to the weld metal and less than about 10 ppm boron passing from the flux system to the weld metal.

One non-limiting object of the present invention is the provision of a flux system using small amounts of titanium and boron to facilitate in the formation of a weld metal having a high toughness without requiring refinement of the weld metal by reheating the weld metal.

An additional and/or alternative non-limiting object of the present invention is provision of a flux system having good slag removal properties.

Still an additional and/or alternative non-limiting another object of the present invention is the provision of a flux system that is basic and that has titanium to transfer from the flux system to the weld metal in smaller amounts than heretofore believed necessary.

Yet an additional and/or alternative non-limiting another object of the present invention is the provision of a flux system that can be used in various electric arc welding procedures and which results in a high toughness as-cast metal having a low Charpy V-notch angle and good slag removal properties.

Still yet an additional and/or alternative non-limiting another object of the present invention is the provision of a flux system which substantially reduces the minimum amount of titanium in the weld metal to increase the slag removal and killing effect of the titanium as it has a sufficient level to maintain the effectiveness of the small amount of boron.

These and other objects and advantages will become apparent from the following description taken together with the accompanying drawings.

DETAIL DESCRIPTION OF THE INVENTION

Referring now in greater detail to the drawings, wherein the showings are for the purpose of illustrating non-limiting embodiments of the invention only, and not for the purpose of limiting the invention, the present invention relates to a basic flux that produces a high toughness weld metal. The flux system is particularly useful in submerged arc welding process and will be described with particular reference thereto; however, it will be appreciated that the flux system of the present invention can be used as a coating on a stick electrode or as a fill in a cored electrode.

Figure 1:
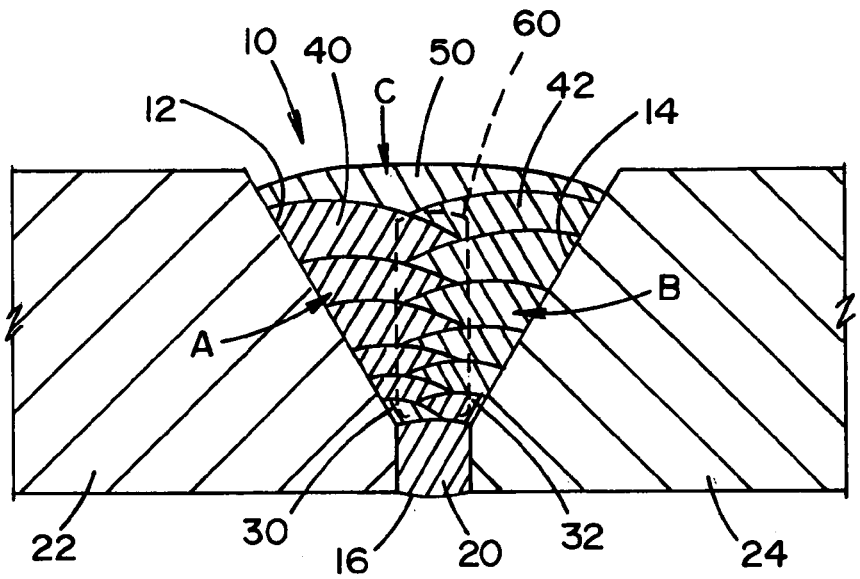
FIG. 1 is an enlarged cross-sectional view showing a welding joint filled with weld metal by a process using the invention.

The flux system of the present invention when used with standard submerged arc welding processes is used to facilitate in the filling of joint 10 with a weld metal. Joint 10 as illustrated in FIG. 1 has diverging side walls 12, 14 that terminate in a lower root gap 16. This gap is filled by first laying root pass 20 between spaced plates 22, 24 to join the two plates to form an upwardly opening groove. The groove is filled by laying overlapping beads, such as beads 30, 32 on the top of root pass 20. The overlapping beads extend upwardly to the top overlapping beads 40, 42. The total stack of molten metal formed by the several overlapping beads is covered by upper cap pass 50. It is commonly desirable that the weld metal in joint 10 have a toughness generally equal to the toughness of plates 22, 24.

Figure 1A:
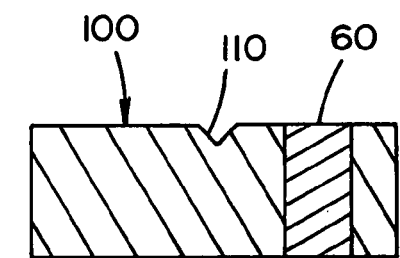
FIG. 1A is a top view of a Charpy V-notch test specimen with the notch placed in the general area A of FIG. 1.
Figure 1B:
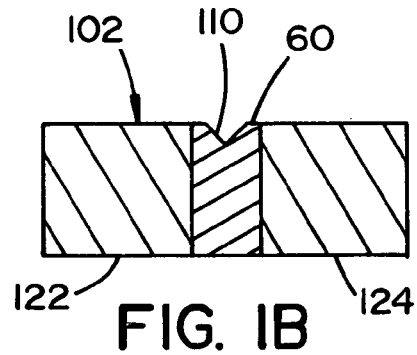
FIG. 1B is a top view of a test specimen as shown in FIG. 1A, with the notch placed in the general area B of FIG. 1.
Figure 1C:
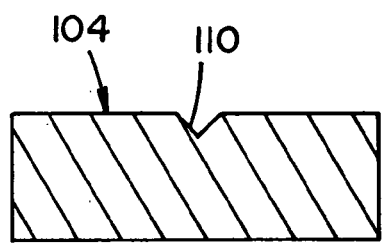
FIG. 1C is a top view of a test specimen, as shown in FIG. 1A, with the notch placed in the general area C of FIG. 1.

In the normal welding procedure, one pass is first laid and then another pass is laid until the joint is filled. When one weld bead is laid over another weld bead, the first weld bead has generally solidified and is reheated by the second weld bead. This reheating of the first weld bead causes transformation in the overlapping area that refines the grain size and can cause increased toughness in that transformation area, which transformation area is represented as area 60 in FIG. 1. When prior art welding fluxes were used, transformation area 60 has a fine grain size and a high toughness; however, the as-cast outboard areas outside this transformation area are not hardened or toughened. When testing the toughness of the various areas in the joint of FIG. 1, Charpy impact test specimens 100, 102 and 104 are machined from areas A, B and C, respectively of joint 10. Each of the specimens includes a standard notch 110 to define the impact area of the specimen. Specimen 100 shown in FIG. 1A has the notch 110 in the as-cast area 120 with refined area 60 outborne of notch 110. Thus, the Charpy impact test for area A merely measures the as-cast, less tough portion of joint 10. Specimen 102 is cut from joint 10 with transformation area 60 corresponding with the test notch 110. This specimen tests the hardness of transformation area 60 located between as-cast area 122, 124. The test results from specimen 100 are different from the test results from specimen 102. This difference reveals that the joint is weaker in certain areas between plates 22 and plates 24. Test specimen 104 is taken from cap pass 50 and has no transformation area; therefore, the metal of specimen 104 is as-cast and has a toughness generally corresponding with the toughness of specimen 100. Depending on the property requirements needed by a welding joint, the toughness of the weld metal in specimens 100 and 104 may be considered unacceptably weak. If this determination is made, joint 10 must be reheated to transform the as-cast material into a fine grain metal to obtain the benefit of most patented levels of titanium and boron used for forming joint 10.

Some prior art fluxes have attempted to overcome the problems of prior flux systems by using very low levels of titanium and boron. However, these fluxes have a high ratio of titanium to boron, thus resulting in large amounts of titanium being transferred to the weld metal, which in turn adversely affects slag removal from the weld metal. The flux system of the present invention overcomes the disadvantages of both the patented and commercial prior art used to form the joint shown in FIG. 1. The flux system of the present invention can be used to increase toughness of the as-cast metal formed the joint and still allow for excellent slag removal from the weld metal.

Figure 2:
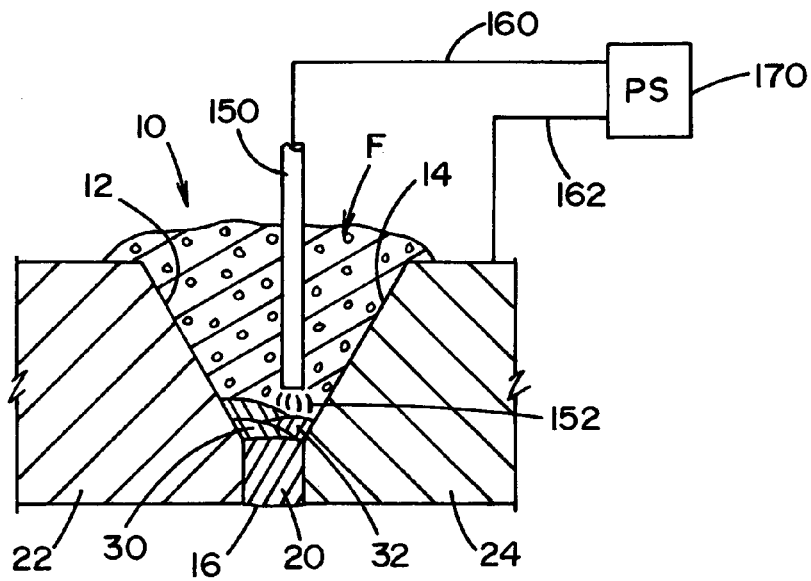
FIG. 2 is a side elevational view of a submerged arc welding process to produce the joint shown in FIG. 1 using flux produced in accordance with the present invention.

The present invention is directed to the use of a novel flux F that can be used in a submerged arc welding process as schematically illustrated in FIG. 2. Flux F has controlled amounts of titanium and boron to provide as-cast grain refining and to also lower the amount of titanium so as to improve slag removal from the weld metal. In accordance with the present invention, the use of flux F results in a weight ratio of titanium to boron in the weld metal of about 1.5-2.0:1. The titanium in the weld metal from flux F is drastically reduced to a range of about 10-12 ppm. The titanium in the flux itself is in the range of about 0.10-0.20 weight percent, whereas the boron in the flux is about 0.020-0.030 weight percent. In one non-limiting example, the titanium in the weld metal is less than about 15 ppm and the flux contains a metal fluoride, such as, but not limited to, calcium fluoride. Generally, flux F is highly basic with a basicity in the range of more than 2.0; however, a more mild basicity index of 1.5-2.0 can be used. Flux can have a composition set forth in Table 1.

TABLE 1

| Compound | Weight Percent Range | Specific Weight Percent |
|---|---|---|
| $SiO_2$ | 0-20% | 15% |
| MgO | 25-35% | 30% |
| $CaF_2$ | 20-30% | 25% |
| $Al_2O_3$ | 0-30% | 20% |
| CaO | 0-10% | 5% |
| $Mn_xO_y$ | 0-5% | 2% |
| $TiO_2$ | 0.2-0.4% | 0.3% |
| $B_2O_3$ | 0.06-0.10% | 0.08% |

As set forth in Table 1, the titanium source is titanium dioxide. The flux does not use a rutile slag system, but employs a fluoride basic slag system. As can be appreciated, the titanium dioxide can be partially or fully substituted by elemental titanium metal powder. In a like manner, the boron in the flux is provided by boron oxide; however, elemental boron metal powder can be partially of fully substituted for the boron oxide.

Figure 2A:
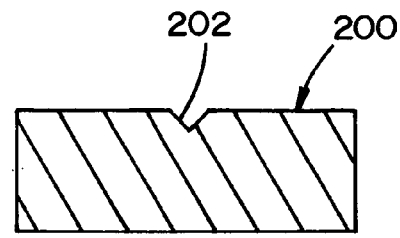
FIG. 2A is a Charpy V-notch specimen with the notch placed in any area of the joint filled using the novel flux of the invention.

Joint 10 is formed as described in FIG. 2 by the use of an advancing welding wire 150 with electric arc 152 between the end of the wire and the workpiece to melt and deposit weld metal into the joint. Power lead 160 is connected to power source 170 which is grounded by lead 162. In this manner, welding wire 150 moves along joint 10 to deposit overlapping weld beads to fill the groove between diverging walls 12, 14. By using the novel flux F for submerged arc welding, it has been found that the as-cast metal laid during the welding process is transformed into fine grain without need for reheating. Consequently, Charpy V-notch specimen 200 shown in FIG. 2A has fine grain metal at notch 202, irrespective of the position in joint 10 from which the specimen is removed. The transformation of much, if not all, of the volume of weld metal is accomplished by reducing the amount of titanium and maintaining a low level of both titanium and boron in the weld metal as deposited. It has been found that the gamma steel is consumed before the acicular ferrite can be formed. This results in the formation of a fine grain metal during the cooling process. The titanium provides a good substrate upon which the alpha ferrite can nucleate. The boron migrates to the grain boundaries during solidification to lower the energy level at the grain boundaries so the grain boundaries act more as if they were part of the matrix to prevent the alpha ferrite from growing during the cooling process. The flux F used in the welding process as illustrated in FIG. 2 produces a tough as-cast metal essentially throughout joint 10.

Figure 3:
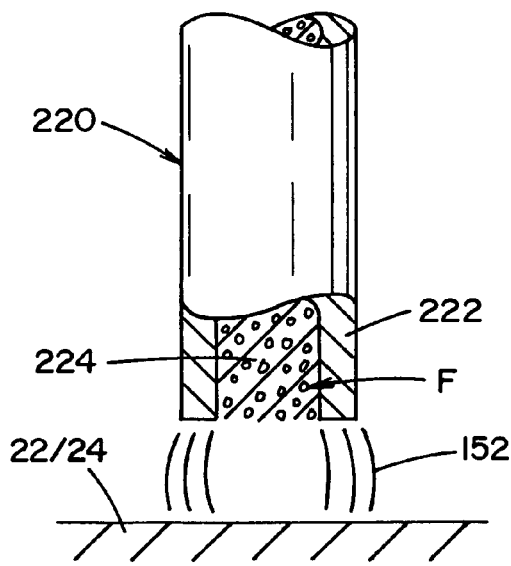
FIG. 3 is an enlarged side-elevational view in partial cross-section illustrating the use of the present invention in a cored electrode.
Figure 4:
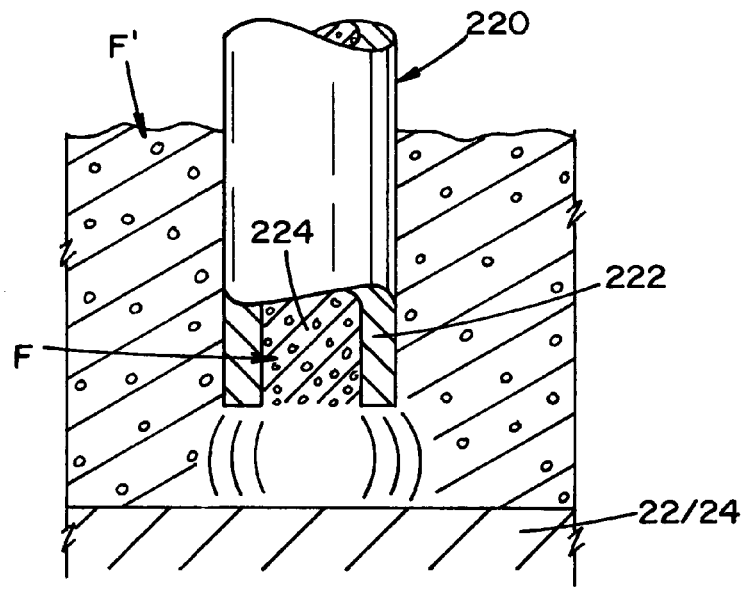
FIG. 4 is a view similar to FIG. 3 wherein the cored electrode is used in a submerged arc process.

As illustrated in FIGS. 3 and 4, novel flux F can also be used in a cored electrode 220. Cored electrode 220 includes a sheath 222 and a core 224. Core 224 is illustrated as filled with flux F and any metal powder necessary for alloying. Cored electrode 220 can be a gas-shielded electrode or a self shielding electrode. Referring now to FIG. 4, electrode 220 is used in connection with bulk flux F'. This bulk flux F' can be the composition as flux F; however, this is not required. Flux F in both of the embodiments set forth in FIGS. 3 and 4 facilitates in producing an as-cast metal having a high toughness without requiring transformation by reheating of the total joint 10 and with excellent slag removal.

Figure 5:
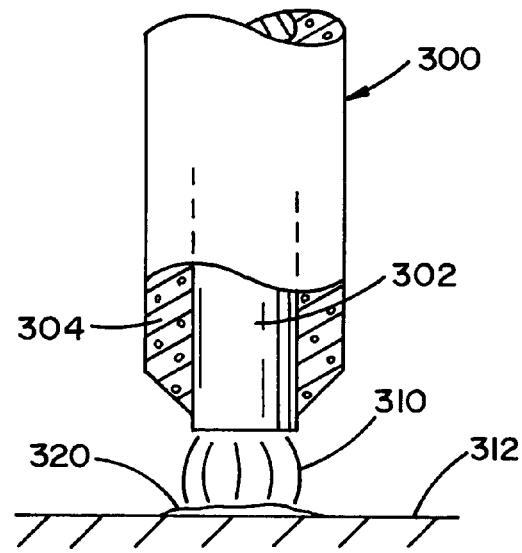
FIG. 5 is a side-elevational view partially cross-sectioned illustrating the use of the present invention for a stick electrode.

Referring now to FIG. 5, novel flux F can be used as coating 304 of stick electrode 300 having a center metal rod 302. Arc 310 between rod 302 and workpiece 312 deposits weld metal 320 onto workpiece 312 to form joint 10, as shown in FIG. 1. Weld metal 320 has fine grain as-cast condition to provide a high toughness layer of metal on workpiece 312. Thus, flux F has been shown to produce high toughness weld metal when employing submerged arc welding, shielded gas flux cored welding, stick electrode welding or other types of electric arc welding.

Figure 6:
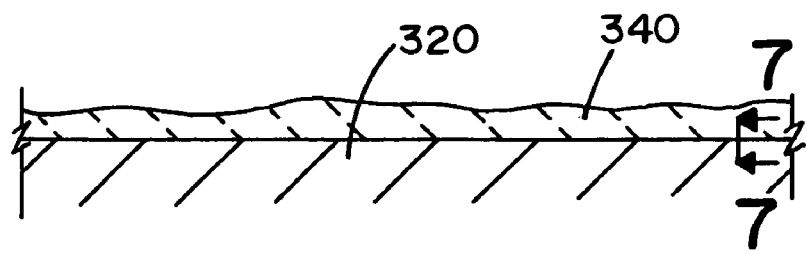
FIG. 6 is an enlarged cross-sectional view of the slag formed on top of the weld metal using the present invention; and, FIG. 7 is an enlarged cross-sectional view taken generally along line 7-7 of FIG. 6.
Figure 7:
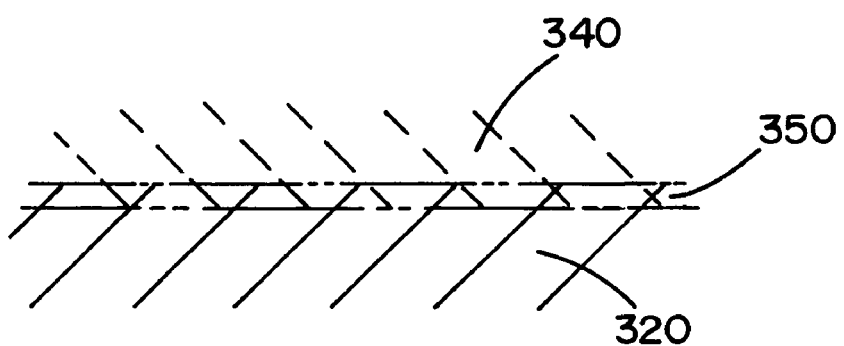

The flux of the present invention has a reduced amount of titanium with small amounts of and boron. By reducing the titanium in the flux and the amount of titanium in the weld bead, slag 340 formed on weld metal 320 creates a very weak bond at interface 350 as shown in FIGS. 6 and 7. Consequently, slag 340 can be easily removed from weld metal 320 after the weld metal has solidified. The reduction in titanium in the weld metal has been found to substantially reduce the holding force between the slag and weld metal when using novel flux F in any of the various welding processes illustrated in FIGS. 2, 3, 4 and 5. Slag removal can be measured by a standardized procedure developed by The Lincoln Electric Company and disclosed in pending application Ser. No. 11/180,321 filed on Jul. 13, 2005, which is incorporated herein by reference.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to a preferred embodiment. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

Having thus described the invention, the following is claimed:

1. A flux system for use in an electric arc welding process for depositing a weld metal, the flux system comprising a slag forming compound, a titanium source and a boron source, said titanium source and boron source having a weight ratio of titanium to boron of about 1.5-20:1, said slag forming compound constituting a majority weight percent of said flux system, said slag forming compound including at least two compounds selected from the group consisting of aluminum oxide, calcium fluoride, calcium oxide, magnesium oxide, or mixtures thereof, wherein said flux system includes magnesium oxide at about 15-40% by weight of said flux system, and wherein said weld metal includes about 5-15 ppm titanium and about 1-10 ppm boron.

2. The flux system as defined in claim 1, wherein said titanium source in said flux is about 0.05-0.25 weight percent of said flux system.

3. The flux system as defined in claim 1, wherein said boron source in said flux is about 0.005-0.04 weight percent of said flux system.

4. The flux system as defined in claim 1, wherein said slag forming compound includes metal fluoride.

5. The flux system as defined in claim 1, wherein said flux has a basicity index of over about 1.5.

6. The flux system as defined in claim 1, wherein said slag forming compound includes metal fluoride, calcium oxide and magnesium oxide.

7. The flux system as defined in claim 1, wherein said titanium source is titanium metal powder, titanium oxide, or mixtures thereof.

8. The flux system as defined in claim 1, wherein said boron source is boron metal powder, boron oxide, or mixtures thereof.

9. The flux system as defined in claim 1, wherein said flux is contained in a core of a flux cored electrode.

10. The flux system as defined in claim 1, comprising by weight percent:

| | |
|---|---|
| $SiO_2$ | 0-30% |
| MgO | 15-40% |
| $CaF_2$ | 10-35% |
| $Al_2O_3$ | 0-35% |
| CaO | 0-15% |

-continued

| | |
|---|---|
| $Mn_xO_y$ | 0-10% |
| $TiO_2$ | 0.05-0.6% |
| $B_2O_3$ | 0.01-0.15 |

11. The flux system as defined in claim 1, comprising by weight percent:

| | |
|---|---|
| $SiO_2$ | 0-20% |
| MgO | 25-35% |
| $CaF_2$ | 20-30% |
| $Al_2O_3$ | 0-30% |
| CaO | 0-10% |
| $Mn_xO_y$ | 0-5% |
| $TiO_2$ | 0.2-0.4% |
| $B_2O_3$ | 0.06-0.10% |

12. The flux system as defined in claim 1, comprising by weight percent:

| | |
|---|---|
| $SiO_2$ | 10-18% |
| MgO | 26-32% |
| $CaF_2$ | 22-28% |
| $Al_2O_3$ | 18-24% |
| CaO | 2-6% |
| $Mn_xO_y$ | 1-3% |
| $TiO_2$ | 0.25-0.33% |
| $B_2O_3$ | 0.07-0.09% |

13. A method of electric arc welding in a particular welding process to obtain a weld metal with high toughness without reheating, the improvement comprising using in combination:
   a. selecting a flux system that includes slag forming compound, a titanium source and a boron source, said titanium source and boron source having a weight ratio of titanium to boron of about 1.5-20:1, said slag forming compound constituting a majority weight percent of said flux system, said slag forming compound including at least two compounds selected from the group consisting of aluminum oxide, calcium fluoride, calcium oxide, magnesium oxide, or mixtures thereof, wherein said flux system includes magnesium oxide at about 15-40% by weight of said flux system;
   b. providing a consumable metal electrode; and,
   c. generating an electric arc to at least partially melt said flux system and said consumable metal electrode, said at least partial melting of said flux system resulting in titanium and boron in said flux system to enter into a weld metal formed by the at least partial melting of said consumable metal electrode, wherein said weld metal includes about 5-15 ppm titanium and about 1-10 ppm boron.

14. The method as defined in claim 13, wherein said welding process is a submerged arc welding process.

15. The method as defined in claim 13, wherein said welding process is a FCAW process.

16. The method as defined in claim 13, including the step of easily removing a slag that has formed on said weld metal after said weld metal has solidified.

17. The method as defined in claim 13, wherein said titanium source in said flux is about 0.05-0.25 weight percent of said flux system.

18. The method as defined in claim 13, wherein said boron source in said flux is about 0.005-0.04 weight percent of said flux system.

19. The method as defined in claim 13, wherein said flux has a basicity index of over about 1.5.

20. The method as defined in claim 13, wherein said slag forming compound includes metal fluoride, calcium oxide and magnesium oxide.

21. The method as defined in claim 13, wherein said flux system comprises by weight percent:

| | |
|---|---|
| $SiO_2$ | 0-30% |
| MgO | 15-40% |
| $CaF_2$ | 10-35% |
| $Al_2O_3$ | 0-35% |
| CaO | 0-15% |
| $Mn_xO_y$ | 0-10% |
| $TiO_2$ | 0.05-0.6% |
| $B_2O_3$ | 0.01-0.15 |

22. The method as defined in claim 13, wherein said flux system comprises by weight percent:

| | |
|---|---|
| $SiO_2$ | 10-18% |
| MgO | 26-32% |
| $CaF_2$ | 22-28% |
| $Al_2O_3$ | 18-24% |
| CaO | 2-6% |
| $Mn_xO_y$ | 1-3% |
| $TiO_2$ | 0.25-0.33% |
| $B_2O_3$ | 0.07-0.09% |

\* \* \* \* \*